(12) United States Patent
Shoaib et al.

(10) Patent No.: US 9,904,874 B2
(45) Date of Patent: Feb. 27, 2018

(54) HARDWARE-EFFICIENT DEEP CONVOLUTIONAL NEURAL NETWORKS

(71) Applicant: Microsoft Technology Licensing, LLC, Redmond, WA (US)

(72) Inventors: Mohammed Shoaib, Redmond, WA (US); Jie Liu, Medina, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 143 days.

(21) Appl. No.: 14/934,016

(22) Filed: Nov. 5, 2015

(65) Prior Publication Data

US 2017/0132496 A1    May 11, 2017

(51) Int. Cl.
G06K 9/62    (2006.01)
G06K 9/66    (2006.01)
G06N 3/063   (2006.01)

(52) U.S. Cl.
CPC ............. *G06K 9/66* (2013.01); *G06K 9/6268* (2013.01); *G06N 3/063* (2013.01)

(58) Field of Classification Search
CPC ......... G06K 9/66; G06K 9/6268; G06N 3/063
See application file for complete search history.

(56) References Cited

U.S. PATENT DOCUMENTS

| 6,067,383 A * | 5/2000 | Taniguchi ............... G06F 17/14 348/390.1 |
| 7,747,070 B2 | 6/2010 | Puri |
| 8,442,927 B2 | 5/2013 | Chakradhar et al. |
| 2011/0047317 A1* | 2/2011 | Burkard .............. G06F 12/0888 711/103 |
| 2014/0028828 A1 | 1/2014 | Hunt et al. |

(Continued)

FOREIGN PATENT DOCUMENTS

CN    104091341 A    10/2014

OTHER PUBLICATIONS

Liu et al; Sparse convolutional neural networks; CVPR'15 (Proc), pp. 806-814; Jun. 7, 2015. (XP032793491).*

(Continued)

*Primary Examiner* — Chan Park
*Assistant Examiner* — Elisa Rice
(74) *Attorney, Agent, or Firm* — Klarquist Sparkman, LLP

(57) ABSTRACT

Systems, methods, and computer media for implementing convolutional neural networks efficiently in hardware are disclosed herein. A memory is configured to store a sparse, frequency domain representation of a convolutional weighting kernel. A time-domain-to-frequency-domain converter is configured to generate a frequency domain representation of an input image. A feature extractor is configured to access the memory and, by a processor, extract features based on the sparse, frequency domain representation of the convolutional weighting kernel and the frequency domain representation of the input image. The feature extractor includes convolutional layers and fully connected layers. A classifier is configured to determine, based on extracted features, whether the input image contains an object of interest. Various types of memory can be used to store different information, allowing information-dense data to be stored in faster (e.g., faster access time) memory and sparse data to be stored in slower memory.

14 Claims, 10 Drawing Sheets

(56) References Cited

U.S. PATENT DOCUMENTS

| | | | |
|---|---|---|---|
| 2015/0117760 A1* | 4/2015 | Wang | G06K 9/4628 |
| | | | 382/157 |
| 2016/0224868 A1* | 8/2016 | Hsiao | G06K 9/4647 |

OTHER PUBLICATIONS

Smullen, IV, et al., "Relaxing Non-Volatility for Fast and Energy-Efficient STT-RAM Caches," 12 pages, Feb. 2011.

Chang et al., "Technology Comparison for Large Last-Level Caches (L3Cs): Low-Leakage SRAM, Low Write-Energy STT-RAM, and Refresh-Optimized eDRAM," 12 pages, Feb. 2013.

Alex Krizhevsky, Ilya Sutskever, and Geoffrey E. Hinton,"ImageNet Classification with Deep Convolutional Neural Networks," NIPS 2012.

Michael Figurnov, Dmitry Vetrov, and Pushmeet Kohli. "PerforatedCNNs: Acceleration through Elimination of Redundant Convolutions," Computer Vision and Pattern Recognition, arXiv:1504.08362, Apr. 30, 2015.

Ross Girshick, Jeff Donahue, Trevor Darrell, and Jitendra Malik. "Rich feature hierarchies for accurate object detection and semantic segmentation," Computer Vision and Pattern Recognition, arXiv:1311.2524 (submitted on Nov. 11, 2013), revised Oct. 22, 2014.

Ali Sharif Razavian, Hossein Azizpour, Josephine Sullivan, Stefan Carlsson, "CNN Features off-the-shelf: an Astounding Baseline for Recognition," Computer Vision and Pattern Recognition, arXiv:1403.6382, Jun. 23, 2014.

NVidia Inc. "Tesla K40 GPU Accelerator, board specification," BD-06902-001_v05, 2013.

Venkat Chandrasekaran, Sujay Sanghavi, Pablo A. Parrilo. Alan S. Willsky, "Sparse and Low-Rank Matrix Decomposition," Siam J. Optim. vol. 21, No. 2, pp. 572-596, Sep. 30, 2009.

Haitham Hassanieh, Piotr Indyk, Dina Katabi, and Eric Price, "Simple and Practical Algorithm for Sparse Fourier Transfor," SODA, Jan. 2012.

Steven W. Smith, "The Scientist and Engineer's Guide to Digital Signal Processing," Chapter 24. ISBN 0-7506-7444-X, 1997.

Clement Farabet, Berin Martini, Polina Akselrod, Selc, uk Talay, Yann LeCun and Eugenio Culurciello, "Hardware Accelerated Convolutional Neural Networks for Synthetic Vision Systems," ISCAS, Proceedings of 2010 IEEE International Symposium on IEEE, 2010.

Vinayak Gokhale, Jonghoon Jin, Aysegul Dundar, Berin Martini and Eugenio Culurciello, "A 240 G-ops/s Mobile Coprocessor for Deep Neural Networks," CVPR, Jun. 2014.

Chen Zhang et al, "Optimizing FPGA—based Accelerator Design for Deep Convolutional Neural Networks," FPGA, Feb. 2015.

Kalin Ovtcharov, et al, "Accelerating Deep Convolutional Neural Networks Using Specialized Hardware," MSR Tech Report, Feb. 22, 2015.

Yunji Chen, Tao Luo et al., "DaDianNao: A Machine-Learning Supercomputer," IEEE MICRO, Dec. 2014.

Ron Rubinstein, Michael Zibulevsky, and Michael Elad "Double Sparsity: Learning Sparse Dictionaries for Sparse Signal Approximation," IEEE Transactions on Signal Processing, vol. 58, No. 3, Mar. 2010.

I. Markovsky, "Structured low-rank approximation and its applications," Automatica, vol. 44, Issue 4, Apr. 2008, pp. 891-909.

Inderjit S. Dhillon, Suvrit Sra, "Generalized Nonnegative Matrix Approximations with Bregman Divergences," NIPS, 2005.

Gray, R.M. "Vector Quantization," IEEE ASSP Magazine 1 (2): 4-29, 1984.

International Search Report and Written Opinion, International Application No. PCT/US2016/059338, 11 pages, Feb. 8, 2017.

Rippel et al., "Spectral Representations for Convolutional Neural Networks," http://arxiv.org/abs/1506.03767v1, 10 pages, Jun. 11, 2015 (accessed Jan. 27, 2017).

Vasilyev, "CNN Optimizations for Embedded Systems and FFT," http://cs231n.stanford.edu/reports/tema8_final.pdf, 7 pages, Mar. 25, 2015 (accessed Aug. 28, 2015).

Liu et al., "Sparse Convolutional Neural Networks," *Proceedings of the 2015 IEEE Conference on Computer Vision and Pattern Recognition (CVPR '15)*, pp. 806-814, Jun. 7, 2015.

Mathieu et al., "Fast Training of Convolutional Networks Through FFTS," http://arxiv.org/abs/1312.5851v4, 9 pages, Feb. 18, 2014 (accessed Jan. 27, 2017).

"Second Written Opinion Issued in PCT Application No. PCT/US2016/059338", dated Oct. 16, 2017, 7 Pages.

* cited by examiner

HARDWARE-EFFICIENT DEEP CONVOLUTIONAL NEURAL NETWORKS

BACKGROUND

A neural network implements a computational approach based to some extent on the central nervous systems of animals Neural networks can be used in artificial-intelligence-based approaches to machine learning that may be applied, for example, in speech recognition, image recognition/object detection, and other areas. Neural networks are composed of interconnected "neurons" that make decisions based on input value(s) and threshold(s). Convolutional neural networks are a class of neural networks that typically involve three stages of computation—convolutional layer(s), fully connected layer(s), and classifier(s).

Although convolutional neural networks perform well compared with more limited modeling-based approaches to machine learning, implementing convolutional neural networks in hardware incurs a high energy and computational complexity cost. For example, convolutional layers typically involve a high computational complexity, and fully connected layers typically involve a high memory storage cost. These factors, among others, deter implementation of convolutional neural networks in power-constrained devices such as wearables and mobile devices.

SUMMARY

Examples described herein relate to hardware-efficient implementations of deep convolutional neural networks. A memory can be configured to store a sparse, frequency domain representation of a convolutional weighting kernel. A time-domain-to-frequency-domain converter can be configured to, by a processor, generate a frequency domain representation of an input image. The input image can be a video frame or image captured by a camera. A feature extractor can be configured to access the memory and, by the processor, extract features based on the sparse, frequency domain representation of the convolutional weighting kernel and the frequency domain representation of the input image. A classifier can be configured to, by the processor, determine, based on extracted features, whether the input image contains an object of interest.

In some examples, multiple memories of different memory types are used to store different information, allowing information-dense data to be stored in faster (e.g., faster access time) and higher energy consumption memory and sparse data to be stored in slower (but lower energy consumption) memory. For example, a slower memory type (or a lower energy consumption memory type) can be used to store sparse matrices of the frequency domain representation of the convolutional weighting kernel, and one or more faster memory types can be used to store a dense matrix of the frequency domain representation of the convolutional weighting kernel, fully connected layer coefficients, and/or image/video frame coefficients.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the claimed subject matter will become more apparent from the following detailed description, which proceeds with reference to the accompanying figures.

DETAILED DESCRIPTION

Figure 1:
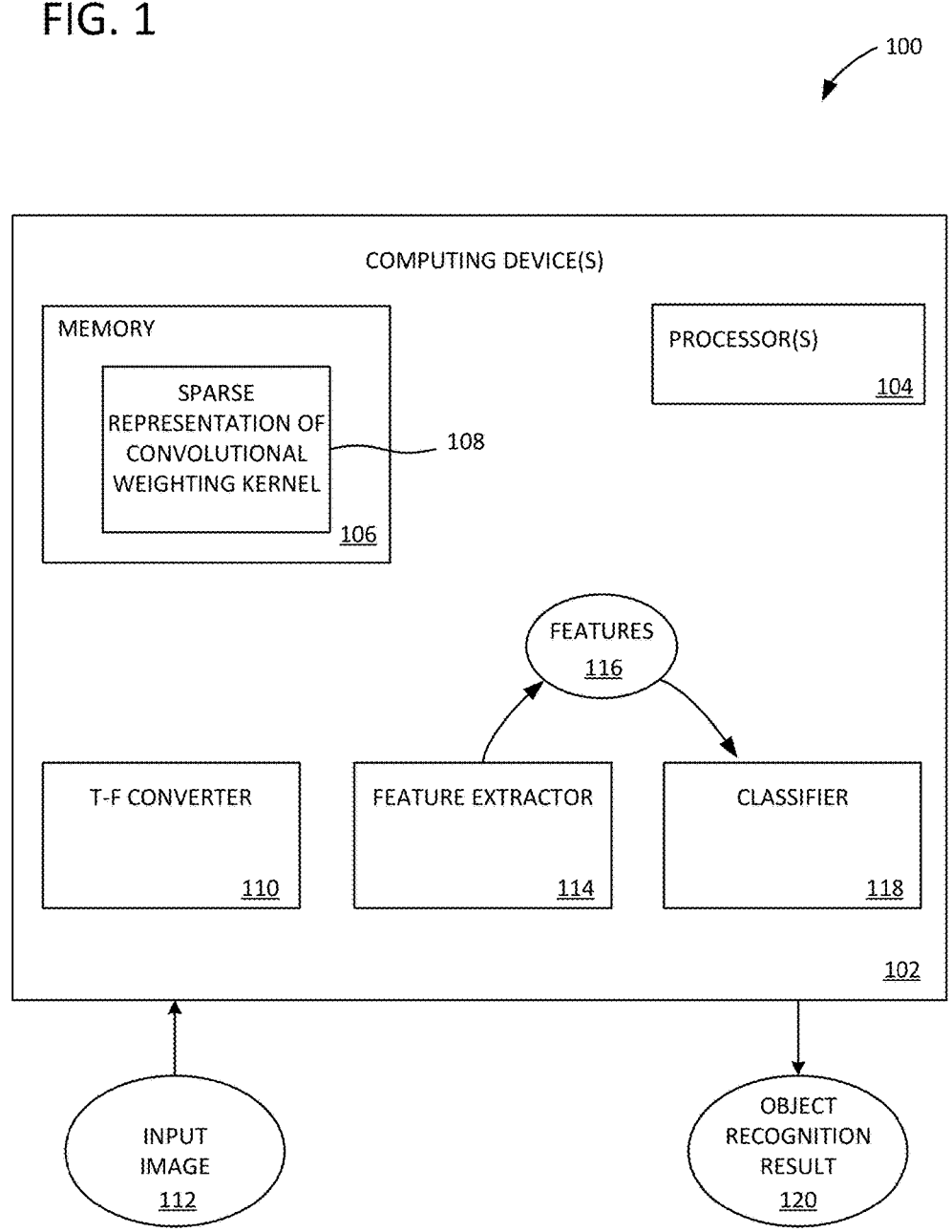
FIG. 1 is a block diagram of an example hardware-efficient convolutional neural network system.

Using the systems, methods, and computer-readable media described herein, deep convolutional neural networks can be efficiently implemented in hardware. Unlike conventional implementations of convolutional neural networks that typically have high energy and computational costs, the described examples allow convolutional neural networks to be used in power-constrained devices such as wearables and mobile devices. As specific examples, hardware efficient convolutional neural networks can be implemented in an augmented or virtual reality headset or mobile device application in which battery life is limited.

In the convolutional layers of a convolutional neural network, the convolution operation (e.g., convolving an image with a weighting kernel) is conventionally computationally intensive because convolution is a mathematically complex operation. In the described examples, the convolutional weighting is done in the Fourier (frequency) domain, which substantially reduces the complexity of the convolutional weighting step. Memory and computational requirements are also reduced in the described examples by representing the convolutional weighting kernel as a sparse, frequency domain representation (e.g., one or more sparse matrices and a dense matrix). The sparse matrices, which are information sparse and have a smaller storage size than the dense matrix, can be stored in memory and accessed in each convolutional layer. The dense matrix, which is information dense and has a larger storage size, can be applied after the convolutional layers, greatly reducing the computational cost and complexity of the convolutional layers. In some of the described examples, additional operations are performed in the frequency domain, allowing the application of the dense matrix to be further delayed and thus reducing the computational and memory cost. Additional examples are described in detail below with reference to FIGS. 1-10.

Overview of Neural Networks

As discussed briefly above, neural networks are composed of interconnected "neurons" that make decisions based on input value(s) and threshold(s). At a neuron, a non-linear function (also referred to as an activation function) is applied to an input, and the output of the non-linear function is compared to a threshold. Example non-linear functions include a rectified linear unit (ReLU), hyperbolic tangent (tan h), sigmoid function, or other non-linear function. The neuron can, for example, provide an output of "1" if the value of the non-linear function applied to the input is greater than the threshold or an output of "0" if the value of the non-linear function applied to the input is less than the threshold.

The neurons in a neural network can have different levels of connectivity. In a fully connected neural network, each input is provided to each neuron (or the neurons are otherwise each interconnected with every other neuron). In a partially connected neural network, an input is provided to one or more neurons, but each input is typically not provided to each neuron (or the neurons are interconnected with some other neurons but not all other neurons). Other types of connectivity include arbitrary connectivity and neighbor connectivity as well as convolutional connectivity, discussed below. The greater the connectivity between neurons, the greater the "richness" of the thresholds, allowing the neurons to capture more information. For neurons receiving multiple inputs, the non-linear function is typically applied to all of the inputs.

As an example, a neural network can be represented as a function $f(\Sigma w_i, x_i, t_j)$, where each input $x_i$ has an associated weight $w_i$, and each neuron has a threshold $t_j$. At individual neurons, $w_i x_i$ is computed, the non-linear function is applied, and the result is compared to the threshold $t_j$. Using tan h as the nonlinear function results in the following example comparison:

$$\tan h(B_j + B_0 \Sigma w_i x_i) > t_j \quad (1)$$

where $B_0$ and $B_j$ are constants that are used to maintain the limits of the hyperbolic tangent function.

Neural networks can be used in machine learning and are an example of an artificial-intelligence-based approach to machine learning (as opposed to a modeling-based approach in which a model is specified and various parameters and features of the model are learned). As an example, a neural network can be used to perform image or object recognition. An input image can be converted to an input vector of image pixel values. In a fully connected neural network, each of the pixel values in the input vector is provided to each neuron. A non-linear function is applied to the pixel values at each neuron, and each neuron outputs a value by comparing the result of the non-linear function to the one or more thresholds. The output values from the neurons form an output vector.

The process of creating the output vector from the input vector is known as feature extraction. Unlike model-based approaches that require different approaches to feature extraction for different types of input data, neural-network based feature extraction can be applied to a variety of data with known or unknown characteristics, including speech amplitude data, seismic data, or other sensor data.

The output vector can be provided to a classifier (e.g., a model-based machine learning classifier). The classifier can implement, for example, a support vector machine, decision tree, Fisher's linear discriminant, linear discriminant analysis (LDA), or other classification approach. The classifier analyzes the output vector and classifies the input image as one of a group of classes. In a binary classifier, for example, an image could be classified as either containing (an output of "1") an object of interest (e.g., a face) or not containing (an output of "0") the object of interest.

A neural network is typically trained to determine neuron thresholds and classifier model parameters. Input data and available classifier output labels are provided to a training algorithm which attempts to minimize output error over all classifier output labels. Parameter values and thresholds are found that result in the minimum achievable error.

Overview of Convolutional Neural Networks

A convolutional neural network is a type of neural network in which the neurons have partial connectivity in a particular manner ("convolutional connectivity"). In a convolutional neural network, a two-dimensional (2D) vector can be used as input. The 2D input vector is multiplied (e.g., element-wise multiplication) by a three-dimensional (3D) kernel of weights. A 2D window of pixels having the same 2D dimensions as the 3D kernel of weights can be incremented across the input vector. For each increment, the pixel values of the input window are multiplied by the 3D kernel of weights and an output value corresponding to the 2D window is generated. A 3D input can also be provided to a convolutional neural network. For example, an input image can be represented as three 2D vectors (one for each of red, green, and blue) that are provided to a convolutional neural network.

Deep neural networks have multiple layers, which adds richness to the parameters and thresholds of the neurons, classifiers, and other components of the deep neural networks. Each layer can have a different type of connectivity. Individual layers can include convolutional weighting, non-linear transformation, response normalization, and/or spatial pooling.

As an example, consider a 3D volume representation of an input layer that, in a convolutional weighting layer, is transformed into another 3D volume feeding subsequent convolutional weighting layers and eventually one or more fully connected layers. Various combinations of convolutional layers, fully connected layers, or layers having other connectivity can be used. Various layers can also use max pooling, in which the maximum of a small group is selected as the output (e.g., the maximum value of four adjacent output values is used as the output value). During a 3D convolution weighting stage, a 3D input volume of pixels of dimensionality N×N×D are convolved with H kernels of dimension k×k×D and a stride S (linear step offset). Each 3D kernel is shifted in a sliding-window-like fashion with a stride across the input volume. During each shift, every weight belonging to the 3D kernel can be multiplied and added with every pair-wise input element from the overlapping region of the 3D input volume.

The entire 3D convolution process can be broken down as a sequence of multiple 2D convolutions. A 2D convolution is a mathematical operation frequently used in modern image processing. In 2D convolution, a window of some finite size and shape (also known as support) is scanned across the image. The output pixel value is computed as the weighted sum of the input pixels within the window where the weights are the values of the filter assigned to every pixel of the window itself. The window with its weights is called the convolution weighting kernel (or simply the kernel). This leads to the following finite sum:

$$c[m, n] = a[m, n] \otimes h[m, n] = \sum_{j=0}^{J-1} \sum_{k=0}^{K-1} h[j, k]a[m-j, n-k] \quad (2)$$

where, c [m,n] is the output pixel at location m, n, the input pixel at location j, k is a [j, k] and the weighting kernel at that position is h [j, k]. Boundary conditions during 2D convolution can be handled using zeros, folded pixels, or repeating the pixels at the boundary of the image.

As a specific example, assume a 224×224 pixel image with three layers (representing red, green, and blue values) and a moving window of 11×11 pixels, which represents two dimensions of an 11×11×32 kernel. The window can move one pixel at a time or move with a stride of greater than one pixel. With a stride of four, the output is 55 (or 56) pixels×55 pixels with a depth of 96 pixels (the 32 pixels of the kernel depth×3 (one for each of the red, green, and blue layers)). Additional layers can then also be implemented. As opposed to a convolutional layer, a "dense" layer is a fully connected layer. The size of the stride, kernel size, etc. are design parameters that can be selected through trial and error, empirical observations, etc.

Typical machine-learning applications operate in two stages. First is the training stage, which is both data and computation intensive, and traditionally involves a distributed, high performance data center architecture. The second stage, which is called the testing stage, on the other hand, typically uses a small amount of input (e.g., sensor data) and produces a small output (e.g., labels). However, the testing stage typically involves intense computation on a single set of closely-knit machines. Convolutional neural networks used in a machine learning context also involve training and testing.

For the testing stage of a typical convolutional neural network, three main types of computation are performed—convolutional layers, fully connected layers, and classifiers. The classifiers tend to be computationally benevolent and inexpensive. The convolutional layers tend to have the highest computational complexity due to the numerous convolutions involved. The fully connected layers, on the other hand, typically involve only multiplications but raise the need for a large amount of storage to handle the kernel weights. Thus, although convolutional neural network based testing approaches can provide real-time operation and high algorithmic accuracy, conventional convolutional neural networks are computationally complex and require a large amount of memory. Both of these factors lead to high costs in power and energy.

Example Implementations

In the described examples, the convolutional weighting performed in the convolutional layers is done in the Fourier (frequency) domain. Convolution in the time domain can be converted to multiplication in the frequency domain, which reduces the complexity of convolutional weighting and results in improved device processing speed and reduced power consumption. The described examples can also reduce the memory requirements of convolutional neural networks.

FIG. 1 illustrates a convolutional neural network system 100 implemented on one or more computing device(s) 102. Computing device(s) 102 includes processor(s) 104. A memory 106 is configured to store a sparse, frequency domain representation 108 of a convolutional weighting kernel. In an example sparse representation, an initial data matrix is represented as one or more sparse matrices, in which much of the data are zeros (also referred to as "information sparse") and a dense matrix, in which much of the data are non-zero values (also referred to as "information dense"). The sparse matrix or matrices multiplied by the dense matrix is equal to the initial data matrix. Determining a sparse representation is also referred to as sparse matrix decomposition. Sparse matrix decomposition can be done using a range of techniques, including constrained dictionary learning, non-negative matrix factorization, low-rank expression, vector quantization, and others. Sparse representation reduces overall storage space and can also be used to represent, for example, coefficients in fully connected layers.

A time-domain-to-frequency-domain converter 110 is configured to, by processor(s) 104, generate a frequency domain representation of an input image 112. Time-domain-to-frequency-domain converter 110 can, for example, determine the Fast Fourier Transform (FFT) or other transform of input image 112.

A feature extractor 114 is configured to, by processor(s) 104, access memory 106 and extract a plurality of features 116 from input image 112. Feature extractor 114 is configured to extract features 116 based at least in part on sparse, frequency domain representation 108 of the convolutional weighting kernel and the frequency domain representation of input image 112. Although convolutional frequency domain operations (multiplication) are less computationally intense than convolutional time domain operations (convolution), frequency domain operations add the computation of the Fourier and inverse Fourier transforms, which increases computational cost.

The FFT is an efficient way of transforming an image to the frequency domain. The FFT has a complexity of Order (MNlog(MN)) for an N×N image convolved with an M×M kernel. FFT-based multiplication thus speeds up time-domain convolution for large enough kernel sizes because time-domain convolution has an execution time proportional to $N^2M^2$, which is much higher than Order(MNlog(MN)). Plotting these complexities shows that FFT-based convolution can be inefficient for kernel sizes that are very small. There are also various ways of speeding up the FFT so that convolution computation speed can be increased even for small kernel sizes.

Feature extractor 114 can be configured, however, to perform additional operations in the frequency domain to limit the number of Fourier and inverse Fourier transforms that must be performed. In such examples, rather than performing, for example, an FFT and an inverse FFT in each convolutional layer, the operations of each layer can be performed in the frequency domain to limit the FFT to the initial FFT of input image 112 and an inverse FFT after the convolutional (or fully connected) layers. Feature extractor 114 can comprise a plurality of convolutional layers and a plurality of fully connected layers. Example convolutional and fully connected layers are illustrated in detail in FIGS. 3 and 4.

In some examples, feature extractor 114 can be configured to, in a first convolutional layer, multiply the frequency domain representation of input image 112 by the one or more sparse matrices and apply a nonlinear function to a result of the multiplication. Feature extractor 114 can also be configured to perform spatial pooling, max normalization, and/or other functions. In some examples, the nonlinear function is a frequency domain nonlinear function. Determination of a frequency domain nonlinear function is discussed below.

A second convolutional layer of feature extractor 114 can be configured to multiply a frequency domain output of the first convolutional layer by the one or more sparse matrices and apply a nonlinear function to a result of the multiplication. In such examples, an output from one convolutional layer is an input to a subsequent convolutional layer. An output of a final convolutional layer can also be input to a first fully connected layer, and an output of the first fully connected layer can then be an input a subsequent fully connected layer, etc.

As discussed above, feature extractor 114 saves computing resources by being configured to perform multiplication in the frequency domain rather than convolution in the time domain. Feature extractor 114 can save additional computing and memory resources by delaying multiplication by the dense matrix of sparse, frequency domain representation 108 until after processing in the plurality of convolutional layers and/or processing in the fully connected layers. Each convolutional layer typically has a corresponding dense matrix and one or more sparse matrices (that together represent the convolutional weighting kernel for the layer), and in some examples, the dense matrices for all of the convolutional layers are multiplied after the last convolutional layer or last fully connected layer.

A classifier 118 is configured to, by processor(s) 104, determine, based on extracted features 116, whether input image 112 contains an object of interest, as represented by object recognition result 120. Classifier 118 can be, for example, a binary classifier that determines a "1" or "0" indicating that an object of interest is either present or not present or a multiclass classifer. System 100 can include additional memory (not shown) of a same or different types, and/or memory 106 can be comprised of multiple individual memory units of a same or different types. An example of such a configuration is discussed with respect to FIG. 2. Although system 100 illustrates an input image 112, alternative input data, such as audio data or other sensor data can be provided as an input in addition or in place of input image 112. In such examples, classifier 118 is configured to determine whether the audio or other input contains an aspect of interest (e.g. word or sound of interest).

Figure 2:
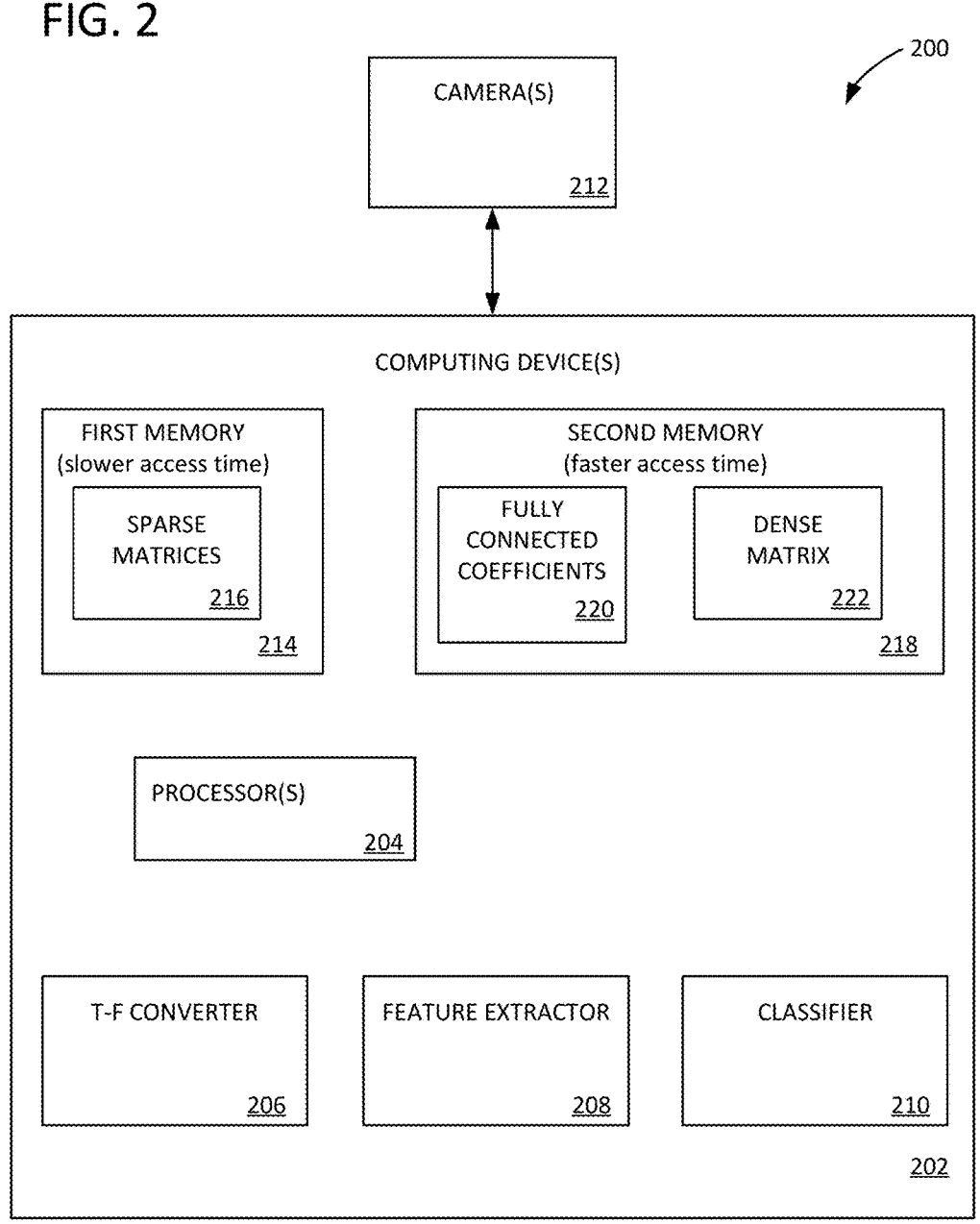
FIG. 2 is a block diagram of an example hardware-efficient convolutional neural network system that includes two types of memory.

FIG. 2 illustrates a convolutional neural network system 200 implemented on one or more computing device(s) 202. System 200 includes several components that are similar to those illustrated in system 100 of FIG. 1, including processor(s) 204, time-domain-to-frequency-domain converter 206, feature extractor 208, and classifier 210. A camera(s) 212 is configured to capture input images or video frames that are provided to time-domain-to-frequency-domain converter 206. Camera(s) 212 can be an RGB, infrared, or other camera. System 200 can include various other sensors (not shown). Camera(s) 212, other sensors, and computing device(s) 202 can be part of a virtual reality or augmented reality system.

A first memory 214 is configured to store one or more sparse matrices 216 of a sparse, frequency domain representation of a convolutional weighting kernel. A second memory 218 is configured to store coefficients 220 for fully connected layers and/or the dense matrix 222 of the sparse, frequency domain representation. Second memory 218 is of a second memory type and first memory 214 is of a first memory type that has a slower access time and/or lower energy consumption than the second memory type. For example, second memory 218 can be SRAM (static random access memory), and first memory 214 can be DRAM (dynamic random access memory). Less-expensive DRAM can be used for first memory 214 because the speed (access time) constraints of DRAM are less important for the small amount of data in the sparse matrices 216. In contrast, fully connected coefficients 220 and dense matrix 222 are information dense and benefit more from the more expensive but faster SRAM.

As another example, first memory 214 can be a memory type that has a lower energy consumption (and lower speed) than SRAM, such as spin-transfer torque (STT) RAM, embedded DRAM (eDRAM), and non-volatile memories such as phase change memory (PCM) or embedded PCM (ePCM). As is the case with DRAM as discussed above, the slower access time with memory types such as STT RAM, etc. is less important because of the small amount of data in the sparse matrices 216. Additionally, memories such as STT RAM also use less energy than DRAM, further extending the life of limited power supplies for mobile devices, wearables, and other power-constrained devices.

In some examples, system 200 includes a third memory configured to store input image coefficients or other data of an intermediate information density. The third memory is of a third memory type and has an access time (or energy consumption level) between the access time or energy consumption level of the first memory type and the access time or energy consumption level of the second memory type. The third memory can be, for example, a structured memory such as content-addressable memory (CAM). In some examples, a single type of memory can be used for first memory 214, second memory 218, and any additional memory (e.g., a third memory as discussed above).

Figure 3:
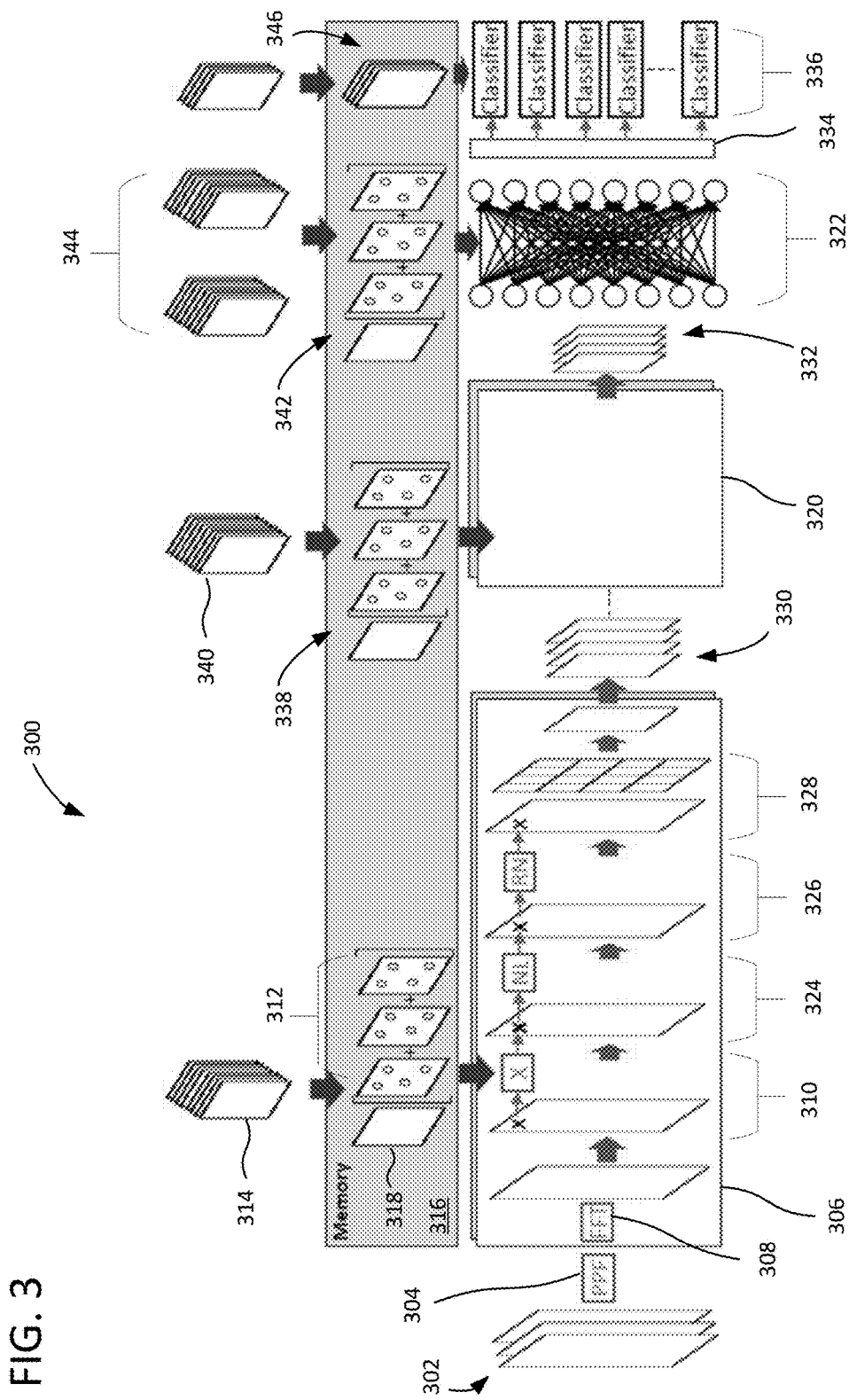
FIG. 3 is a diagram illustrating an example operational flow of a hardware-efficient deep convolutional neural network.

FIG. 3 illustrates a deep convolutional neural network 300. The red, green, and blue portions of an input image 302 (shown as three parallel rectangles) are provided as an input to deep convolutional neural network 300. Polyphase filtering 304 is performed, and the result is provided to a first convolutional layer 306. In some examples, polyphase filtering 304 is omitted. An FFT operation 308 is performed on the input to first convolutional layer 306, and the resulting frequency domain representation is multiplied in convolutional weighting portion 310 by sparse matrices 312 of a frequency domain representation of a convolutional weighting kernel 314.

Convolutional weighting kernel 314 is pre-determined and transformed to the frequency domain (e.g., by using an FFT). In order to multiply convolutional weighting kernel by the transformed input image in first convolutional layer 306, the frequency domain representation of the convolutional weighting kernel is expanded using additional zero values until the kernel and the transformed image are of the same 2D dimensions. The sparse, frequency domain representation of convolutional weighting kernel 314 is stored in memory 316. The sparse representation includes sparse matrices 312 and a dense matrix 318. In some examples, a sparse matrix is determined for each layer of kernel 314. That is, for an 11×11×32 3D kernel, there are 32 sparse, 11×11 matrices. In convolutional weighting portion 310, the sparse matrices are multiplied by the transformed input image, and dense matrix 318 is multiplied after subsequent convolutional layers 320 or fully connected layers 322.

A nonlinear function is applied in portion 324. In some examples, the nonlinear function is a frequency domain function (discussed in more detail below). Response normalization is performed in portion 326, and spatial pooling is performed in portion 328. Various convolutional layers can omit response normalization and/or spatial pooling. An output 330 is provided to subsequent convolutional layers 320.

An output 332 of subsequent convolutional layers 320 is provided to fully connected layers 322. Fully connected layers 322 output an extracted feature vector 334 (or other arrangement of extracted features) that is provided to one or more classifiers 336, which can be, for example, linear classifiers. Classifiers 336 can determine, for example, whether input image 302 contains an object of interest. Memory 316 can also store sparse, frequency domain representations 338 of kernels 340 used in subsequent convolutional layers 320. In some examples kernels 340 and 314 are the same. In other examples, different kernels are used in different convolutional layers.

Memory 316 can also store sparse representations 342 of fully connected layer coefficients 344. In some examples, coefficients 344 are not stored as sparse representations 342. Memory 316 can also store classifier parameters 346 that are used by classifier 336 in classifying input image 302 based on the extracted features in feature vector 334.

As discussed above, remaining in the frequency domain after multiplying sparse matrix 312 with the frequency domain representation of the input image eliminates the computationally intensive inverse FFT (IFFT). In this way, many operations can be performed in the frequency domain, and a single IFFT can be performed after subsubsequent convolutional layers 320 and/or after the last fully connected layer of fully connected layers 322.

In order to remain in the frequency domain, the nonlinear function in first convolutional layer 306 (and in subsequent convolutional layers 320) is converted to a frequency domain function. A convolutional layer can be viewed as applying a certain nonlinear function g(y) to an input function ƒ(x), so to determine a frequency domain nonlinear function, the Fourier transform F(g(f(x)) with respect to F(f(x)) can be determined. As a specific example, consider the ReLU nonlinear function, where g(y)=ReLU(y). ReLU (also written as ReLu) acts to clip data in the time domain. It creates sharp corners in the signal, so in the frequency domain this adds higher frequency harmonics to the spectrum.

Mathematically, ReLu(f(x)) can be expressed through f(x) as a multiplication with the sign(f(x)): which is equal to 1 if f(x)>0 and 0 otherwise:

$$ReLu(f(x)) = \max\{f(x), 0\} = H[f(x)] * f(x) \quad (3)$$

where H is the Heaviside function.

Because f(x) has a limited number of samples, ReLu can be expressed through a multiplication with a sum of delta functions:

$$H[f(x)] * f(x) = f(x) * \Sigma_i \delta(x - x_i), f(x_i) > 0 \quad (4)$$

where δ is a delta function.

The Fourier transform of a delta function is given by:

$$F(\delta(x - x_0))(k) = e^{2\pi j k\, x_0} \quad (5)$$

Using the linearity of FFTs and the convolution theorem, the Fourier transform of ReLu(f(x)) can be expressed through the Fourier transform of f(x):

$$F(ReLU(f(x)))(k) = (\Sigma_i e^{2\pi j k x_i}) \otimes F(f(x)) \quad (6)$$

This shows that in the frequency domain, ReLu( ) acts as a convolution with the function of known form. However, this function depends on the input, so positions are found in the x space domain: ƒ $x_i$>0. This can be accomplished by taking the inverse transforms of the input and solving the inequality. Thus, once x has been found, the transfer function of the ReLu is known for this input, and FFTs do not need to be calculated.

This is illustrated by the following example. Assume an input image having red, green, and blue portions, each being multiplied by a frequency domain representation of a convolutional weighting kernel ($K_1$, $K_2$, and $K_3$). Without a frequency domain nonlinear function, after the frequency domain representation of the image (I) is multiplied by a frequency domain representation of the kernel, the result ($F_1$, $F_2$, $F_3$) is in the frequency domain. An IFFT is then used to transform the result to the time domain ($f_1$, $f_2$, $f_3$), and the ReLu function is applied to generate $g_1$, $g_2$, and $g_3$. Using an FFT, frequency domain outputs $G_1$, $G_2$, and $G_3$ are determined. These outputs serve as inputs to the next convolutional layer. This is shown below in equation group (7).

$$
\begin{array}{lll}
I & I & I \\
F_1 = I \times K_1 & F_2 = I \times K_2 & F_3 = I \times K_3 \\
f_1 = IFFT(F_1) & f_2 = IFFT(F_2) & f_3 = IFFT(F_3) \\
g_1 = ReLu(f_1) & g_2 = ReLu(f_2) & g_3 = ReLu(f_3) \\
G_1 & G_2 & G_3
\end{array}
\quad (7)
$$

$G_1$, $G_2$, and $G_3$ are the output of the layer and input to a next layer as shown below in equation group (8).

$$
\begin{array}{lll}
T_1 = G_1 \times K_4 & T_2 = G_2 \times K_5 & T_3 = G_3 \times K_6 \\
k_1 = IFFT(T_1) & k_2 = IFFT(T_2) & k_3 = IFFT(T_3) \\
h_1 = ReLu(k_1) & h_2 = ReLu(k_2) & h_3 = ReLu(k_3)
\end{array}
\quad (8)
$$

As with the previous layer, the next layer will need frequency domain inputs ($H_1$, $H_2$, and $H_3$) to multiply with the frequency domain representation of the convolutional weighting kernel. In equation group 8, $K_4$, $K_5$, and $K_6$ are frequency domain convolutional weighting kernels and can be the same as or different from $K_1$, $K_2$, and $K_3$. Because of the nature of the ReLu function, discussed above with respect to delta functions, equation group (9) can be determined and used instead of taking the approach in equation group (7) and applying the IFFT and then, prior to the next stage, the FFT.

$$
\begin{array}{lll}
I & I & I \\
F_1 = I \times K_1 & F_2 = I \times K_2 & F_3 = I \times K_3 \\
G_1 = \sum e * (I \times K_1) & G_2 = \sum e * (I \times K_2) & G_3 = \sum e * (I \times K_3)
\end{array}
\quad (9)
$$

Thus, we can avoid invoking the IFFT in every stage of the computation. Although the ReLU nonlinear function is used here as an example, the approach also applies to other nonlinear functions.

Figure 4:
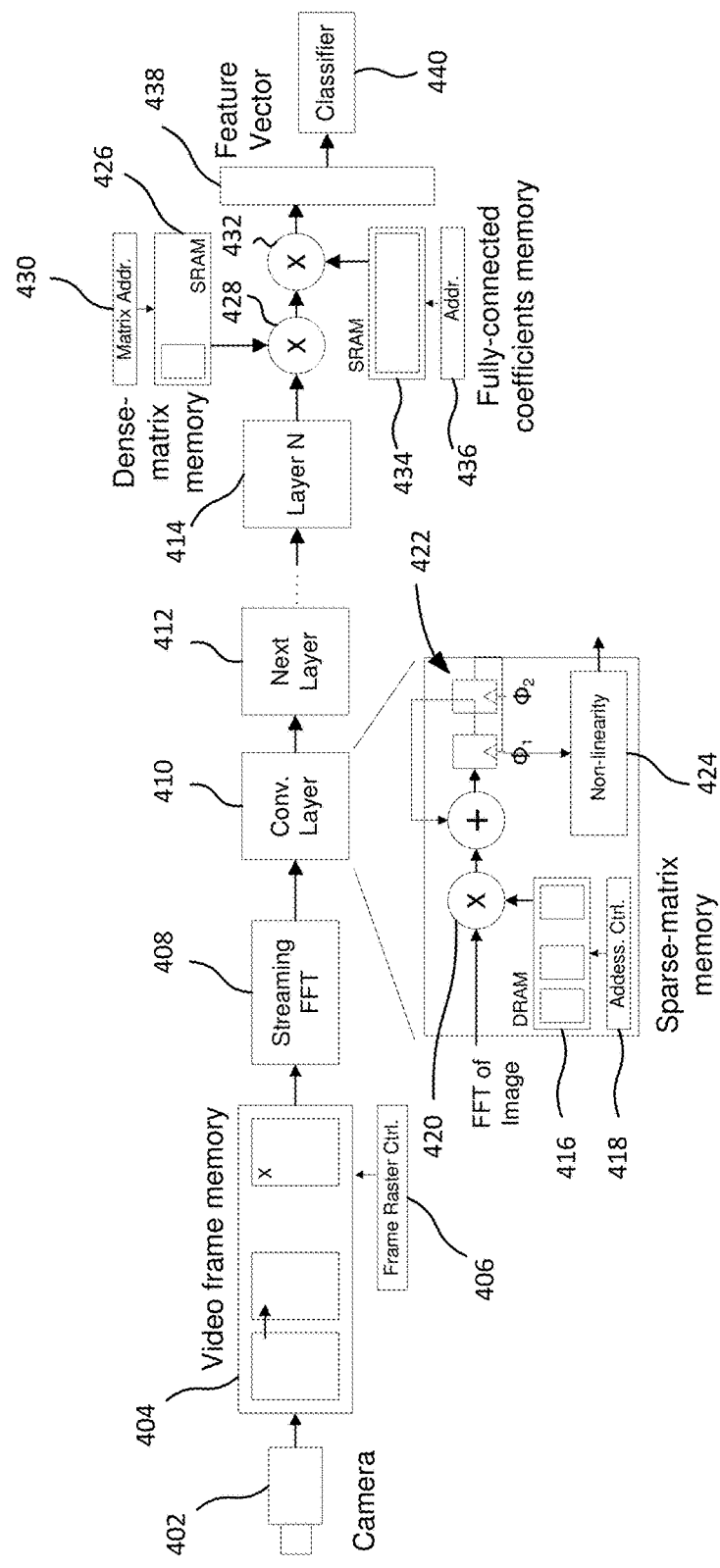
FIG. 4 is a block diagram illustrating example hardware and an example operational flow of an example hardware-efficient convolutional neural network system.

FIG. 4 illustrates a hardware-level block diagram of an example hardware-efficient convolutional neural network system 400. Images captured from a camera 402 are buffered in a video-frame memory 404. The frames can be processed sequentially in a first-in first-out (FIFO) order. A frame-raster controller 406 reads pixels from the frame that is being processed in a raster order. The pixels are sent into an FFT streamer 408 that locally buffers the pixel and produces the Fourier transform of the image. FFT streamer 408 processes sets of pixels of a size that depends on the number of points used in the FFT block. For example, a 1024 point FFT would require 1024 pixels to be buffered and processed. The FFT of the image is streamed one pixel at a time from FFT streamer 408. The Fourier transformed pixels are processed by the layers 410, 412, and 414 of the convolutional neural network system 400. Layers 410, 412, and 414 include multiple convolutional layers and can also include at least one fully connected layer.

In (first) convolutional layer 410, a Hadamard product is determined based on the Fourier transform of the image (or the output of the previous stage) and the sparsely-represented coefficients of the filter maps (kernel weights) used in that layer that are stored in memory 416. The kernel weights in the respective layers are transformed to the Fourier domain and represented using a sparse decomposition that can employ a linear combination of sparse matrices weighted by a dense matrix. The sparse matrices are read out of memory 416 sequentially using an address controller 418.

The Fourier transformed pixel is multiplied at multiplier 420 with the sparse coefficients at the corresponding location. The outputs of the multiplier 420 are accumulated using control clocks 422, shown as $\Phi_1$ and $\Phi_2$. The latter clock depends on the number of sparse matrices. If the sparse representation has k sparse matrices, $\Phi_2$ ticks once after every k ticks of $\Phi_1$. The registered summation of the Hadamard products (i.e., output of $\Phi_2$) is passed on to a nonlinear block 424, which applies the non-linear transformation in the Fourier domain and produces the transformed output for layer 410. This process continues for up to N stages (as represented by layer 414) for a convolutional neural network of depth N.

The output of the final convolutional layer (e.g., layer 414) multiplies with collapsed dense matrix coefficients stored in memory 426 at multiplier 428. The dense matrix used at this point is the collapsed version (product of) the multiple dense matrices obtained from the coefficients of the individual convolutional layers. The dense matrix elements are stored in memory 426 and pulled in a non-linear manner by address controller 430. The output is again multiplied with the coefficients of the fully-connected layer(s) at multiplier 432. The coefficients of the fully-connected layer(s) are stored in memory 434 and are addressed sequentially by address controller 436. Memory 426 and memory 434 can be part of a same memory. It can be difficult to combine the multiplications of multipliers 428 and 432, as the multiplication of multiplier 428 is a matrix-matrix multiplication and the multiplication of multiplier 432 is a scalar-vector multiplication. The output of multiplier 432 is a vector 438 of extracted features. These are registered in a local buffer (not shown) and form the feature vector that is used by classifier 440.

Although memory 416 is shown as DRAM, memory 426 is shown as SRAM, and memory 434 is shown as SRAM, various types of memory can be used for memory 416, 426, and 434. Memory types, and the data stored in various memory types, are discussed in more detail with respect to FIG. 2. Video frame memory 404 can be DRAM, SRAM, structured memory such as CAM, or other memory. Clocks 422, multipliers 420, 428, 432, and other hardware illustrated in FIG. 4 can be part of an application-specific integrated circuit (ASIC), field programmable gate array (FPGA), or other processing unit.

In some examples, a set of parallel multiply-accumulate (MAC) units in each convolutional layer can be used to speed up the computation. Also, parallel multiplier units can be used in the fully-connected and dense-matrix multiplication stages. A parallel set of classifiers can also be used. Such parallelization methods have the potential to speed up the computation even further at the cost of added control complexity.

Figure 5:
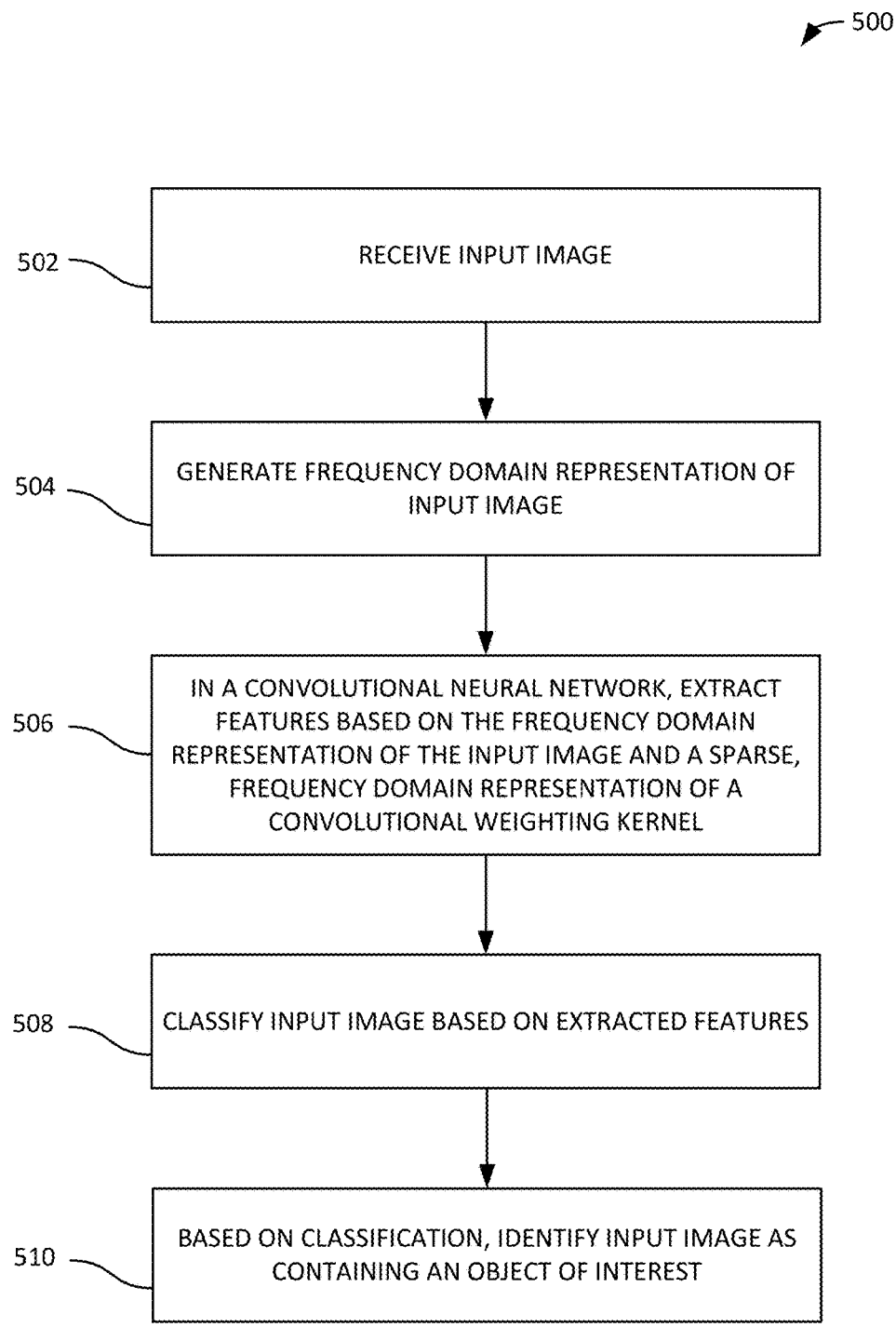
FIG. 5 is a flowchart of an example image recognition method in a convolutional neural network.

FIG. 5 illustrates an image recognition method 500. In process block 502, an input image is received. A frequency domain representation of the input image is generated in process block 504. In process block 506, a plurality of features are extracted in a convolutional neural network. The features are extracted based at least in part on the frequency domain representation of the input image and a sparse, frequency domain representation of a convolutional weighting kernel. The sparse, frequency domain representation of the convolutional weighting kernel comprises a dense matrix and one or more sparse matrices. Process block 506 can also comprise performing convolutional processing in a convolutional portion of the convolutional neural network, and, based on an output of the convolutional processing, performing fully connected processing in a fully connected portion of the convolutional neural network, where the output of the fully connected processing includes the extracted features. Details of feature extraction as performed in process block 506 are discussed with respect to FIGS. 1-4. In process block 508, the input image is classified based on the plurality of extracted features. Based on the classification, the input image is identified as containing an object of interest in process block 510.

Figure 6:
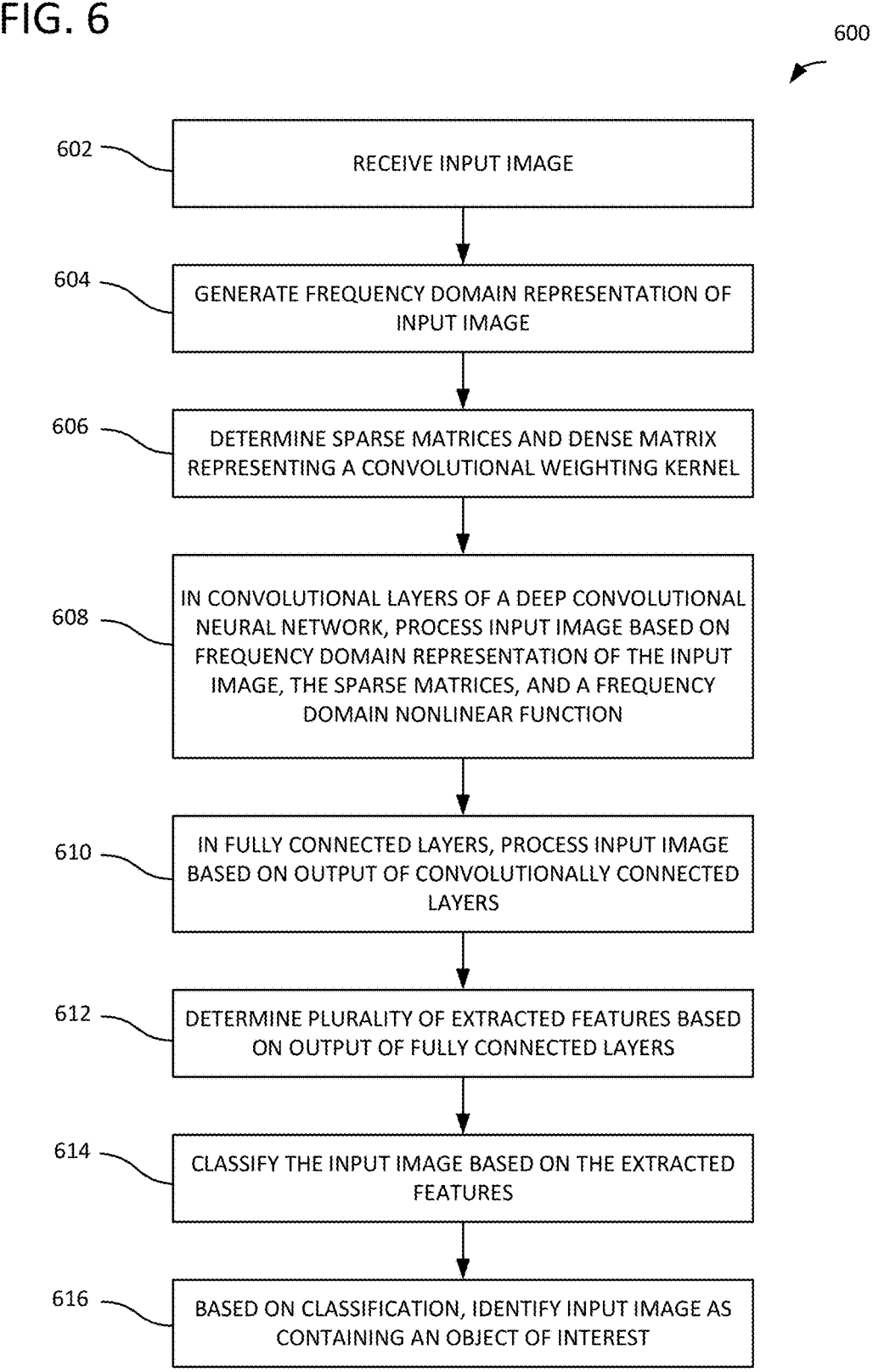
FIG. 6 is a flowchart of an example image recognition method in a convolutional neural network in which the nonlinear function applied in the convolutional layers is a frequency domain nonlinear function.

FIG. 6 illustrates an image recognition method 600. In process block 602, an input image is received. In process block 604, a frequency domain representation of the input image is generated (e.g., by using an FFT). In process block 606, a sparse, frequency domain representation of a convolutional weighting kernel is determined. The sparse, frequency domain representation comprises one or more sparse matrices and a dense matrix. In a plurality of convolutional layers of a deep convolutional neural network, in process block 608, the input image is processed based on the frequency domain representation of the input image, the one or more sparse matrices, and a frequency domain nonlinear function. In a plurality of fully connected layers of the deep convolutional neural network, in process block 610, the input image is processed based on an output of the plurality of convolutional layers. In process block 612, a plurality of extracted features is determined based on an output of the plurality of fully connected layers. The input image is classified in process block 614 based on the extracted features. Based on the classification, the input image is identified as containing an object of interest in process block 616.

Figure 7:
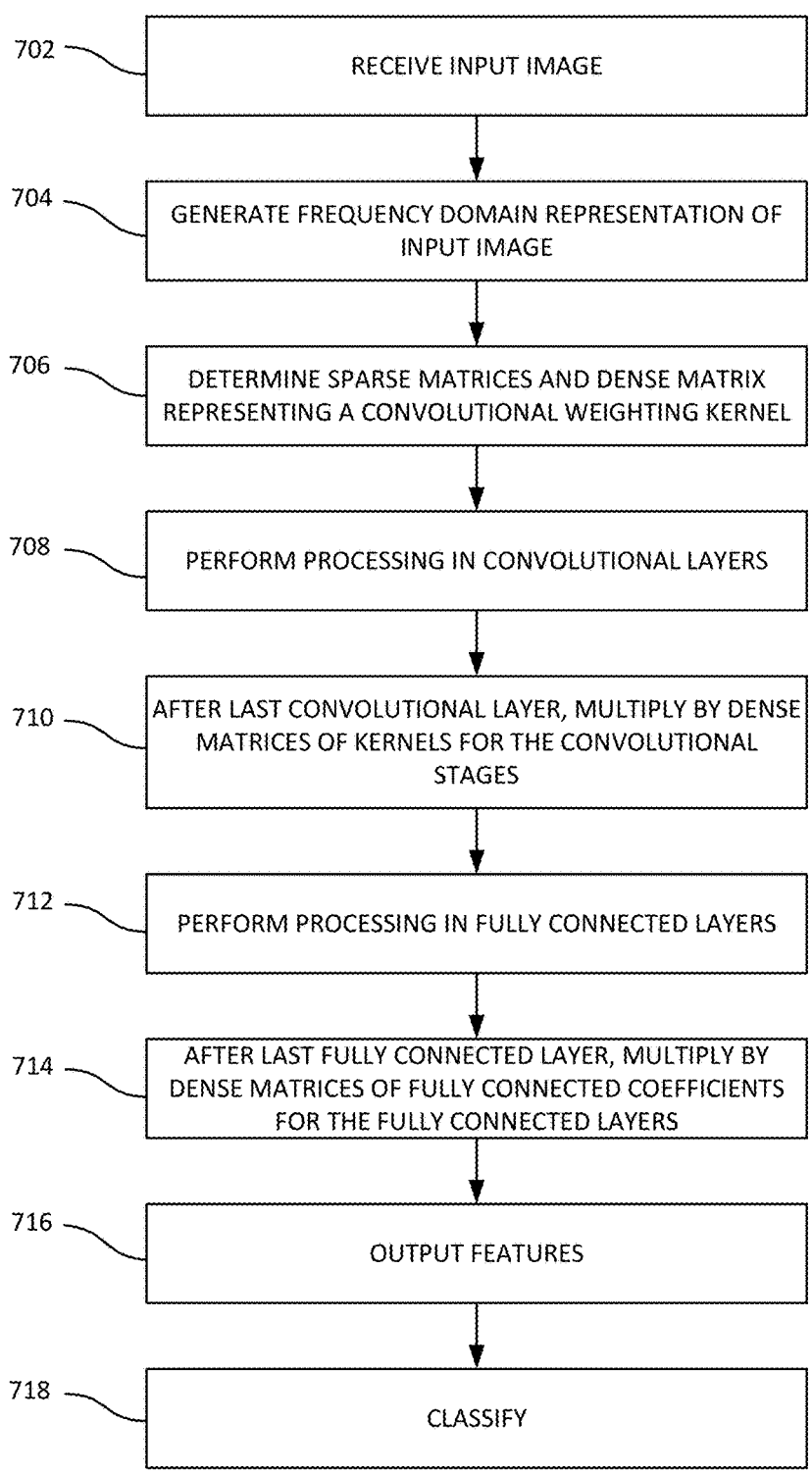
FIG. 7 is a flowchart of an example image recognition method in a convolutional neural network in which the dense matrices of the kernels of the convolutional layers are multiplied by the output of the last convolutional layer.

FIG. 7 illustrates a method 700 of recognizing images in which prior to determining the plurality of extracted features, an output of a last convolutional layer is multiplied by the dense matrices of the weighting kernels of all of the convolutional layers. In process block 702, an input image is received. In process block 704, a frequency domain representation of the input image is generated. In process block 706, sparse matrices and a dense matrix are determined that represent a convolutional weighting kernel. In some examples, a same convolutional weighting kernel is applied in each convolutional layer. In other examples, different convolutional weighting kernels, and therefore different sparse matrices and dense matrix, are used.

In process block 708, processing is performed in a plurality of convolutional layers. Processing can be, for example, as described with respect to FIGS. 1-6. In process block 710, after a last convolutional layer, the output of the layer is multiplied by the dense matrices of the kernels for the convolutional stages (or multiplied by a collapsed version (product) of the dense matrices). In process block 712, processing is performed in one or more fully connected layers. Coefficients for the fully connected layers can be stored as sparse matrices and a dense matrix, and in process block 714, after a last fully connected layer, the output of the layer is multiplied by the dense matrices for the fully connected stages (or multiplied by a collapsed version (product) of the dense matrices). Extracted features are then output in process block 716, and the input image is classified in process block 718 based on the extracted features.

In some examples, additional techniques are used to reduce memory usage and reduce intensity of computation. In some examples, the complexity of the Fourier transform is reduced by using a sparse FFT, which subsamples the input images to compute the Fourier transform efficiently. The complexity of the sparse FFT algorithm can be reduced to linear to even sub-linear depending on the characteristics of the input image. This allows computational energy reductions even in the presence of small kernel sizes.

In some examples, a convolutional neural network is trained in the Fourier domain so that all the kernel weights are obtained in the Fourier domain itself. This avoids the need apply the nonlinear function in the frequency domain.

Example Computing Systems

Figure 8:
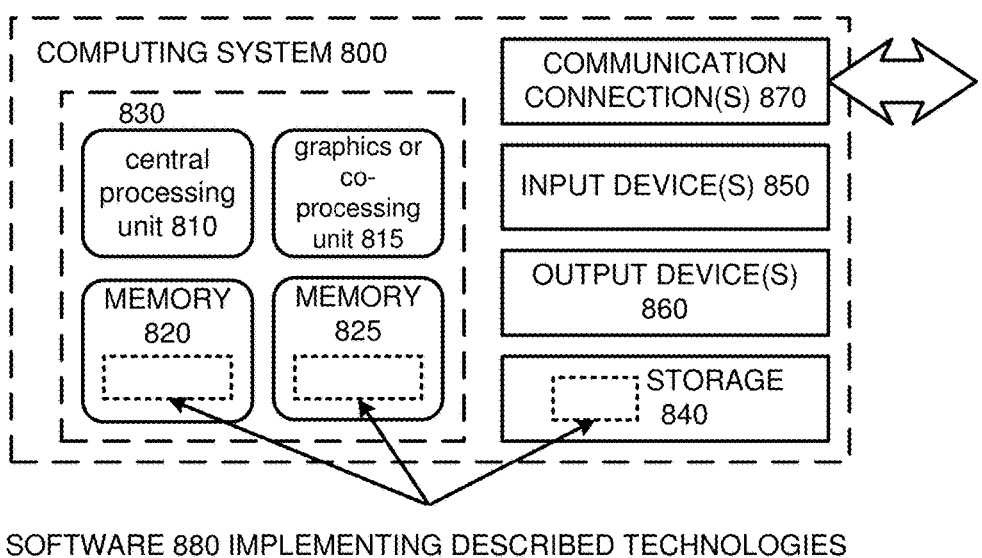
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). For example, memory 820, 825 can store time-domain-to-frequency-domain converter 110, feature extractor 114, and classifier 118 of FIG. 1 and/or time-domain-to-frequency-domain converter 206, feature extractor 208, and classifier 210 of FIG. 2.

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information and which can be accessed within the computing system 800. The storage 840 stores instructions for the software 880 implementing one or more innovations described herein. For example, storage 840 can store time-domain-to-frequency-domain converter 110, feature extractor 114, and classifier 118 of FIG. 1 and/or time-domain-to-frequency-domain converter 206, feature extractor 208, and classifier 210 of FIG. 2.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Mobile Devices

Figure 9:
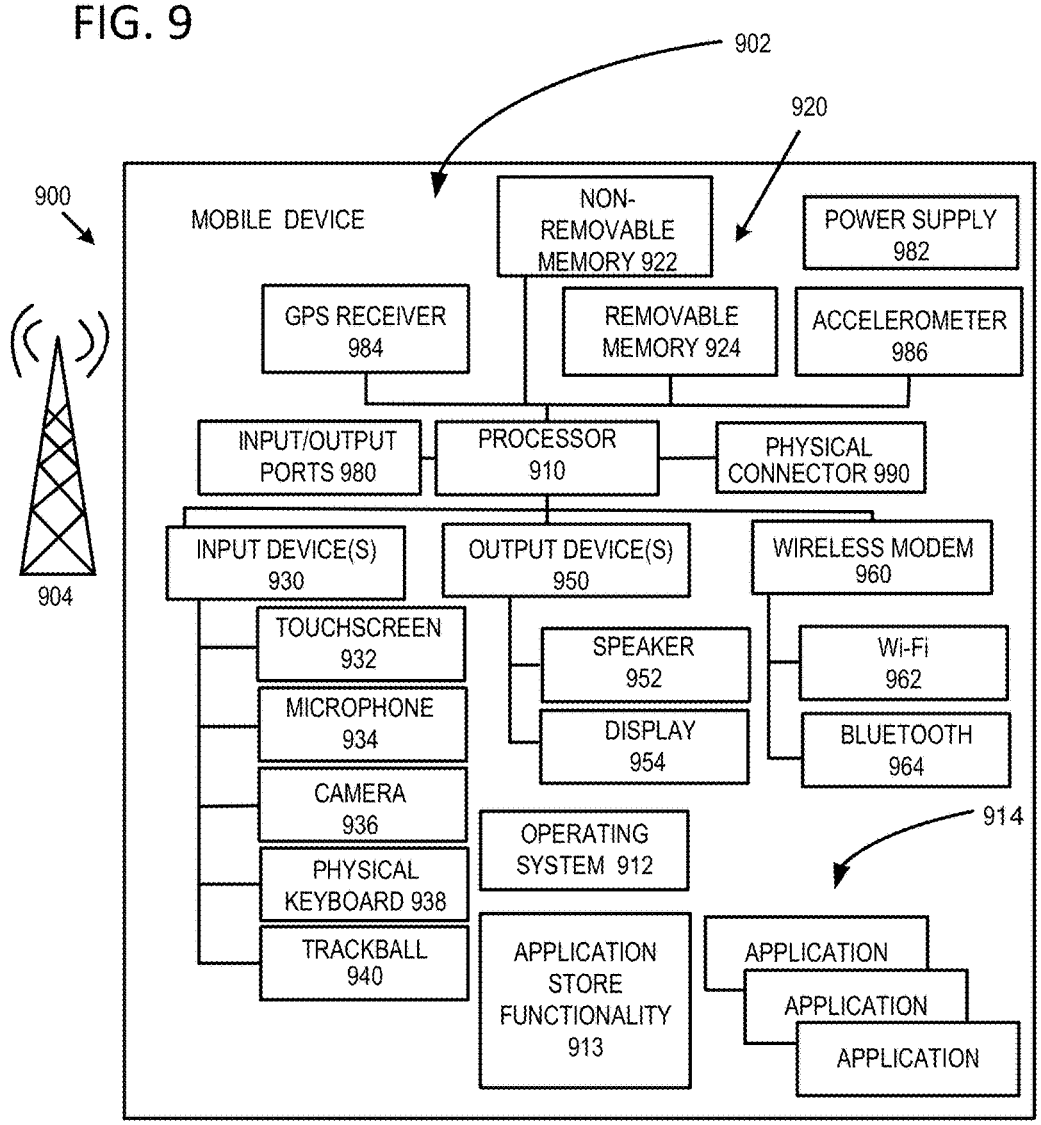
FIG. 9 is an example mobile device that can be used in conjunction with the technologies described herein.

FIG. 9 is a system diagram depicting an example mobile device 900 including a variety of optional hardware and software components, shown generally at 902. Any components 902 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 904, such as a cellular, satellite, or other network.

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for one or more application programs 914. The application programs can include common mobile computing applications (e.g., email applications, calendars, contact managers, web browsers, messaging applications), or any other computing application. The application programs 914 can also include image recognition technology implemented using convolutional neural networks. Functionality 913 for accessing an application store can also be used for acquiring and updating application programs 914.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touchscreen 932, microphone 934, camera 936, physical keyboard 938 and/or trackball 940 and one or more output devices 950, such as a speaker 952 and a display 954. Other possible output devices (not shown) can include piezoelectric or other haptic output devices. Some devices can serve more than one input/output function. For example, touchscreen 932 and display 954 can be combined in a single input/output device.

The input devices 930 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 can comprise speech-recognition software as part of a voice user interface that allows a user to operate the device 900 via voice commands. Further, the device 900 can comprise input devices and software that allows for user interaction via a user's spatial gestures, such as detecting and interpreting gestures to provide input to a gaming application.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM network for data and voice communications within a single cellular network, between cellular networks, or between the mobile device and a public switched telephone network (PSTN).

The mobile device can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be deleted and other components can be added.

Example Cloud-Supported Environments

Figure 10:
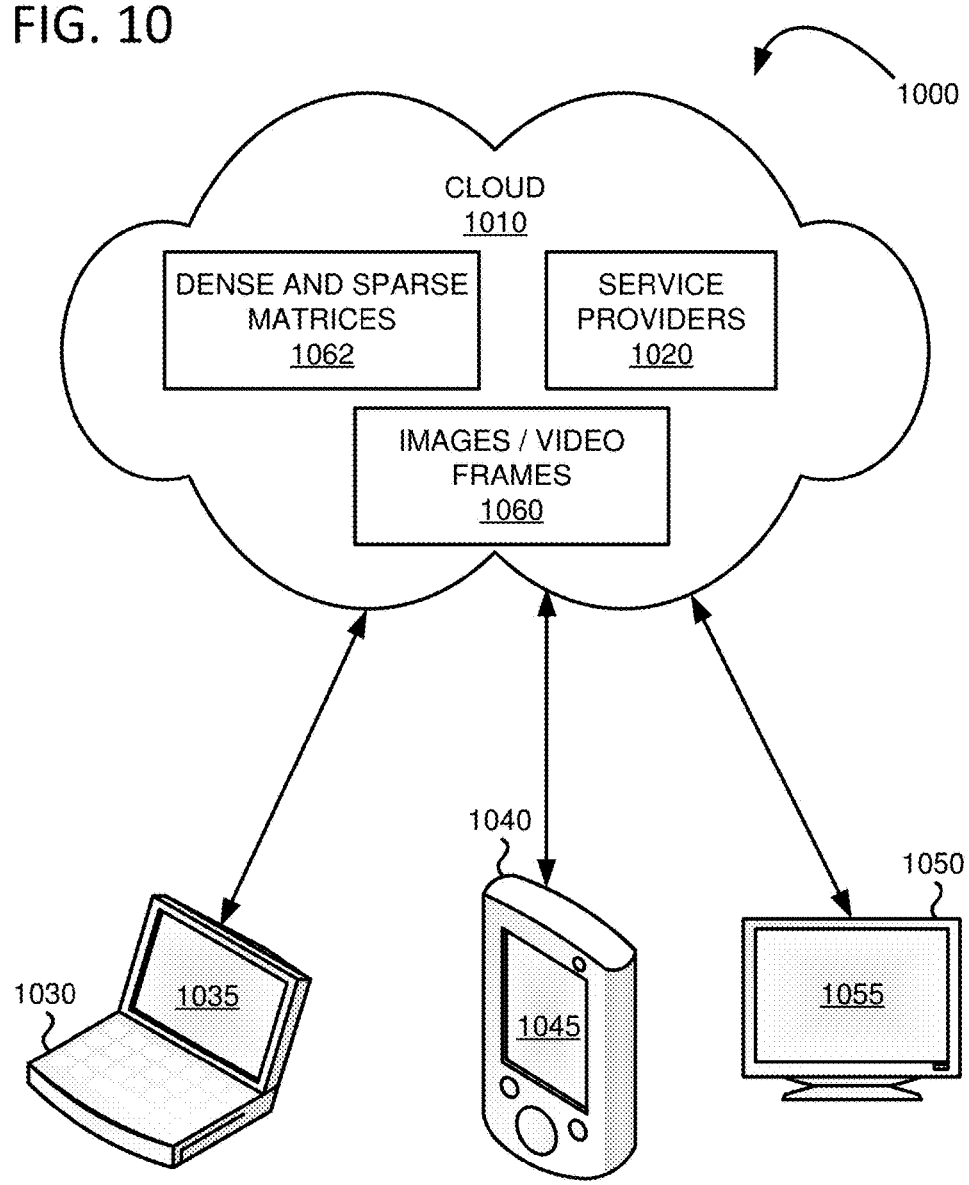
FIG. 10 is an example cloud-supported environment that can be used in conjunction with the technologies described herein.

FIG. 10 illustrates a generalized example of a suitable cloud-supported environment 1000 in which described embodiments, techniques, and technologies may be implemented. In the example environment 1000, various types of services (e.g., computing services) are provided by a cloud 1010. For example, the cloud 1010 can comprise a collection of computing devices, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030, 1040, 1050) while other tasks (e.g., storage of data to be used in subsequent processing) can be performed in the cloud 1010.

In example environment 1000, the cloud 1010 provides services for connected devices 1030, 1040, 1050 with a variety of screen capabilities. Connected device 1030 represents a device with a computer screen 1035 (e.g., a mid-size screen). For example, connected device 1030 can be a personal computer such as desktop computer, laptop, notebook, netbook, or the like. Connected device 1040 represents a device with a mobile device screen 1045 (e.g., a small size screen). For example, connected device 1040 can be a mobile phone, smart phone, personal digital assistant, tablet computer, and the like. Connected device 1050 represents a device with a large screen 1055. For example, connected device 1050 can be a television screen (e.g., a smart television) or another device connected to a television (e.g., a set-top box or gaming console) or the like. One or more of the connected devices 1030, 1040, 1050 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touchscreen capability of a particular connected device (e.g., connected devices 1030, 1040, 1050).

In example environment 1000, the cloud 1010 provides the technologies and solutions described herein to the various connected devices 1030, 1040, 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users). The cloud 1010 can store images and video frames 1060 used as inputs to image recognition systems as described herein and can store dense and sparse matrices 1062.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 8, computer-readable storage media include memory 820 and 825, and storage 840. By way of example and with reference to FIG. 9, computer-readable storage media include memory and storage 920, 922, and 924. The term computer-readable storage media does not include signals and carrier waves. In addition, the term computer-readable storage media does not include communication connections (e.g., 870, 960, 962, and 964).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Pert, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A convolutional neural network system, comprising:
one or more processors;
a memory configured to store a sparse, frequency domain representation of a convolutional weighting kernel, the sparse, frequency domain representation comprising a dense matrix and one or more sparse matrices;
a time-domain-to-frequency-domain converter configured to, by the one or more processors, generate a frequency domain representation of an input image;
a feature extractor comprising a plurality of convolutional layers and a plurality of fully connected layers, the feature extractor configured to, by the one or more processors:
access the memory, and
extract a plurality of features based at least in part on the sparse, frequency domain representation of the convolutional weighting kernel and the frequency domain representation of the input image, wherein a first convolutional layer of the plurality of convolutional layers is configured to: multiply the frequency domain representation of the input image by the one or more sparse matrices and apply a nonlinear function to a result of the multiplication, and wherein prior to generation, by the feature extractor, of a feature vector of the plurality of extracted features, an output of a last convolutional layer is multiplied by the dense matrix; and a classifier configured to, by the one or more processors, determine, based on the plurality of extracted features, whether the input image contains an object of interest.

2. The system of claim 1, wherein the memory is a first memory of a first memory type, and further comprising a second memory configured to store coefficients for the plurality of fully connected layers, wherein the second memory is of a second memory type, and wherein the first memory type has a slower access time or lower energy consumption than an access time or energy consumption of the second memory type.

3. The system of claim 2, wherein the first memory type is DRAM, and wherein the second memory type is SRAM.

4. The system of claim 2, further comprising a third memory configured to store input image coefficients, wherein the third memory is of a third memory type and has an access time or energy consumption between the access time or energy consumption of the first memory type and the access time or energy consumption of the second memory type.

5. The system of claim 1, wherein the nonlinear function is a frequency domain function.

6. The system of claim 1, wherein a second convolutional layer of the plurality of convolutional layers is configured to: multiply a frequency domain output of the first convolutional layer by the one or more sparse matrices and apply a second nonlinear function to a result of the multiplication.

7. The system of claim 1, further comprising a camera configured to capture video, and wherein the input image is a video frame captured by the camera.

8. The system of claim 7, wherein the system is part of a virtual reality or augmented reality system.

9. A method, comprising:
receiving an input image;
generating a frequency domain representation of the input image;
in a convolutional neural network comprising a plurality of convolutional layers and at least one fully connected layer, extracting a plurality of features based at least in part on the frequency domain representation of the input image and a sparse, frequency domain representation of a convolutional weighting kernel, wherein the sparse, frequency domain representation of the convolutional weighting kernel comprises a dense matrix and one or more sparse matrices, wherein the extracting comprises, in a first convolutional layer of the plurality of convolutional layers, multiplying the frequency domain representation of the input image by the one or more sparse matrices and applying a nonlinear function to a result of the multiplying, and wherein prior to generation of a feature vector of the plurality of extracted features, an output of a last convolutional layer is multiplied by the dense matrix;

classifying the input image based on the plurality of extracted features; and
based on the classifying, identifying the input image as containing an object of interest.

10. The method of claim 9, wherein extracting the plurality of features comprises:
performing convolutional processing in a convolutional portion of the convolutional neural network; and
based on an output of the convolutional processing, performing fully connected processing in a fully connected portion of the convolutional neural network, wherein an output of the fully connected processing comprises the extracted features.

11. The method of claim 9, wherein values for the convolutional weighting kernel are determined through training, wherein the one or more sparse matrices are stored in a first memory of a first memory type, wherein the dense matrix is stored in a second memory of a second memory type, and wherein the first memory type has a slower access time than the second memory type.

12. The method of claim 11, wherein the first memory type has lower energy consumption than the second memory type.

13. One or more computer-readable storage media storing computer-executable instructions for recognizing images, the recognizing comprising:
receiving an input image;
generating a frequency domain representation of the input image;
determining a sparse, frequency domain representation of a convolutional weighting kernel, the sparse, frequency domain representation comprising one or more sparse matrices and a dense matrix;
in a plurality of convolutional layers of a deep convolutional neural network, processing the input image based on the frequency domain representation of the input image, the one or more sparse matrices, and a frequency domain nonlinear function;
in a plurality of fully connected layers of the deep convolutional neural network, processing the input image based on an output of the plurality of convolutional layers;
determining a plurality of extracted features based on an output of the plurality of fully connected layers, wherein prior to determination of a feature vector of the plurality of extracted features, an output of a last convolutional layer is multiplied by the dense matrix;
classifying the input image based on the plurality of extracted features; and
based on the classification, identifying the input image as containing an object of interest.

14. The one or more computer-readable storage media of claim 13, wherein the one or more sparse matrices are stored in a first memory of a first memory type, wherein the dense matrix is stored in a second memory of a second memory type, and wherein the first memory type has a slower access time than the second memory type.

* * * * *